(12) United States Patent
Turner (10) Patent No.: US 8,583,714 B2
(45) Date of Patent: Nov. 12, 2013

(54) ROM-BASED DIRECT DIGITAL SYNTHESIZER WITH PIPELINE DELAY CIRCUIT

(75) Inventor: Steven E. Turner, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 849 days.

(21) Appl. No.: 12/704,828

(22) Filed: Feb. 12, 2010

(65) Prior Publication Data

US 2011/0199128 A1 Aug. 18, 2011

(51) Int. Cl.
*G06F 1/02* (2006.01)
(52) U.S. Cl.
USPC .......................................... 708/271; 708/272
(58) Field of Classification Search
None
See application file for complete search history.

(56) References Cited

U.S. PATENT DOCUMENTS

| | | | |
|---|---|---|---|
| 4,992,743 A * | 2/1991 | Sheffer | 327/106 |
| 5,408,687 A | 4/1995 | Ooga | |
| 5,598,440 A | 1/1997 | Domagala | |
| 6,078,629 A | 6/2000 | Critchlow et al. | |
| 6,331,830 B1 | 12/2001 | Song et al. | |
| 6,748,407 B1 | 6/2004 | Oga | |
| 7,542,812 B2 | 6/2009 | Stroili et al. | |
| 7,565,392 B2 | 7/2009 | Turner | |
| 2005/0091295 A1* | 4/2005 | Harron et al. | 708/271 |
| 2008/0159370 A1* | 7/2008 | Atherton | 375/232 |
| 2008/0183924 A1* | 7/2008 | Vergnes et al. | 710/100 |
| 2008/0246641 A1* | 10/2008 | Ohtaka | 341/144 |
| 2010/0194444 A1 | 8/2010 | Patterson | |

OTHER PUBLICATIONS

Turner et al, "ROM-Based Direct Digital Synthesizer at 24 GHz Clock Frequency in InP DHBT Technology", IEEE Microware and Wireless Components Letters, Aug. 2008, pp. 566-568, vol. 18, No. 8.*
Manandhar et al, A 20-GHz and 46-GHz, 32x6-bit ROM for DDS Application in InP DHBT Technology, IEEE, 2006, pp. 1003-1006.
Manandhar et al., 36-GHz, 16x6-Bit ROM in InP DHBT Technology Suitable for DDS Application, IEEE Journal of Solid-State Circuits, Feb. 2007, pp. 451-456, vol. 42, No. 2.
Murphy et al., All About Direct Digital Synthesis, Analog Dialogue 38-08, Aug. 2004, pp. 1-5, http://www.analog.com/analogdialogue.
Semiconductor device fabrication, Wikipedia, Feb. 8, 2010, pp. 1-7, http://en.wikipedia.org/wiki/Semiconductor_device_fabrication.

(Continued)

*Primary Examiner* — Ilwoo Park
(74) *Attorney, Agent, or Firm* — Finch & Maloney PLLC; Neil F. Maloney (57) ABSTRACT

A DDS system is disclosed that is configured to provide a variable clock delay that allows timing of data coming out of the ROM to be adjusted. In one example case, a DDS system is provided that includes a ROM for storing phase-to-amplitude conversion data and generating digital amplitude values corresponding to respective digital phase values, and delay circuitry for adjusting timing of data output by the ROM to compensate for propagation delay of the DDS system. The delay circuitry may include, for instance, delay elements that can be selected alone or in combination to adjust the timing. The timing can be adjusted, for example, by adjusting delay of a clock signal that clocks one or more ROM pipeline registers. The system may include a phase accumulator and DAC, and adjusting the timing may include adjusting delay of a clock signal that clocks one or more DAC pipeline registers.

14 Claims, 5 Drawing Sheets

(56) References Cited

OTHER PUBLICATIONS

Turner et al., 4-Bit Adder-Accumulator at 41-GHz Clock Frequency in InP DHBT Technology, IEEE Microwave and Wireless Components Letters, Mar. 2005, pp. 144-146, vol. 15, No. 3.

Turner et al., Benchmark Results for High-Speed 4-bit Accumulators Implemented in Indium Phosphide DHBT Technology, IEEE Lester Eastman Conference on High Performance Devices, Rensselaer Polytechnic Institute, Aug. 4-6, 2004, pp. 1-16.

Turner et al., Direct Digital Synthesizer With ROM-Less Architecture at 13-GHz Clock Frequency in InP DHBT Technology, IEEE Microwave and Wireless Components Letters, May 2006, pp. 296-298, vol. 16, No. 5.

Turner et al., Direct Digital Synthesizer With Sine-Weighted DAC at 32-GHz Clock Frequency in InP DHBT Technology, IEEE Journal of Solid-State Circuits, Oct. 2006, pp. 2284-2290, vol. 41, No. 10.

Turner, Steven Eugene, High-Speed Digital and Mixed-Signal Components for X- and KU-Band Direct Digital Synthesizers in Indium Phosphide DHBT Technology, A Thesis, May 2006, 172 pages.

Turner et al., ROM-Based Direct Digital Synthesizer at 24 GHz Clock Frequency in InP DHBT Technology, IEEE Microwave and Wireless Components Letters, Aug. 2008, pp. 566-568, vol. 18, No. 8.

\* cited by examiner

ROM-BASED DIRECT DIGITAL SYNTHESIZER WITH PIPELINE DELAY CIRCUIT

STATEMENT OF GOVERNMENT INTEREST

The invention was made with United States Government support under contract DAAD17-02-C-0115 awarded by the Army, and the United States Government has certain rights in this invention.

FIELD OF THE DISCLOSURE

This disclosure relates to communications, and more particularly, to ROM-based direct digital synthesizer architectures.

BACKGROUND

Direct digital synthesizers (DDS) include a phase accumulator, a phase-to-amplitude converter, and a digital-to-analog converter (DAC). In high-speed applications, these functional blocks are generally clocked with pipeline registers internal to each block. The phase-to-amplitude converter can be implemented by various techniques, including using a read only memory (ROM), logic gates, or by a combination of logic gates and a sine-weighted DAC. ROMs, however, are typically not used in high-speed DDS circuits because propagation delays in the ROM circuit make it either impossible to pipeline at high-speed, or are too costly to pipeline in terms of power consumption. As such, instead of a ROM, high-speed DDS circuits typically implement the phase-to-amplitude converter as a combination of logic gates and a sine-weighted DAC. Such conventional approaches suffer from limited spurious-free dynamic range (SFDR), typically in the range of 30 dBc to 40 dBc (i.e., with respect to carrier frequency amplitude) at best.

SUMMARY

One embodiment of the present invention provides a direct digital synthesis (DDS) system. The system includes a read only memory (ROM) for storing phase-to-amplitude conversion data and generating digital amplitude values corresponding to respective digital phase values. The system further includes delay circuitry operatively coupled to the ROM and for adjusting timing of data output by the ROM to compensate for propagation delay of the DDS system, the delay circuitry including a plurality of delay elements that can be selected alone or in combination to adjust the timing of the data output by the ROM. The system may include a phase accumulator for computing the phase values based on a frequency control word. The system may include a digital-to-analog converter (DAC) for converting the digital amplitude values into corresponding analog amplitude values. In one such configuration, the delay circuitry may also be operatively coupled to the DAC and for adjusting timing of data output by the DAC to compensate for propagation delay of the DDS system. In another such configuration, the system may include additional delay circuitry operatively coupled to the DAC and for adjusting timing of data output by the DAC to compensate for propagation delay of the DDS system, the additional delay circuitry including a plurality of delay elements that can be selected alone or in combination to adjust the timing of the data output by the DAC. In one particular case, the delay circuitry may be responsive to a control signal that can change automatically during operation of the DDS system in response to a change in a DDS operating parameter. In one such configuration, the DDS operating parameter may include, for example, a frequency control word input to DDS system, a clock signal for clocking one or more pipeline registers of the ROM, and/or an environmental variable. In another such configuration, the system may further include a processor for generating the control signal. The system may be included, for example, in a system-on-chip configuration, and may also be implemented with discrete components.

A number of variations will be apparent in light of this disclosure. For instance, another example embodiment of the present invention provides a DDS system that includes a phase accumulator for computing the phase values based on a frequency control word. The system further includes a ROM for storing phase-to-amplitude conversion data and generating digital amplitude values corresponding to respective digital phase values provided by the phase accumulator. The system further includes delay circuitry operatively coupled to the ROM and for adjusting timing of data output by the ROM to compensate for propagation delay of the DDS system, the delay circuitry including a plurality of delay elements that can be selected alone or in combination to adjust the timing of the data output by the ROM, and the delay circuitry adjusts the timing of the data output by the ROM by adjusting delay of a clock signal that clocks one or more pipeline registers of the ROM. The system further includes a DAC for converting the digital amplitude values into corresponding analog amplitude values. In one particular such case, the delay circuitry may also be operatively coupled to the DAC and for adjusting timing of data output by the DAC to compensate for propagation delay of the DDS system. In another particular case, the system may further include additional delay circuitry operatively coupled to the DAC and for adjusting timing of data output by the DAC to compensate for propagation delay of the DDS system, the additional delay circuitry including a plurality of delay elements that can be selected alone or in combination to adjust the timing of the data output by the DAC. In another particular case, the delay circuitry may be responsive to a control signal that can change automatically during operation of the DDS system in response to a change in a DDS operating parameter. In one such case, the DDS operating parameter may include at least one of the frequency control word, the clock signal, and/or an environmental variable. In another such particular case, the system may include a processor for generating the control signal. The system may be included, for example, in a system-on-chip or chip set configuration.

Another example embodiment of the present invention provides a DDS system that includes a phase accumulator for computing the phase values based on a frequency control word, and a ROM for storing phase-to-amplitude conversion data and generating digital amplitude values corresponding to respective digital phase values provided by the phase accumulator. The system further includes delay circuitry operatively coupled to the ROM and for adjusting timing of data output by the ROM to compensate for propagation delay of the DDS system, the delay circuitry including a plurality of delay elements that can be selected alone or in combination to adjust the timing of the data output by the ROM, and the delay circuitry adjusts the timing of the data output by the ROM by adjusting delay of a clock signal that clocks one or more pipeline registers of the ROM. The system further includes a DAC for converting the digital amplitude values into corresponding analog amplitude values. The system further includes a processor for generating a control signal to which the delay circuitry is responsive, and changing the control signal in response to a change in a DDS operating parameter, the DDS operating parameter including at least one of the frequency control word, the clock signal, and/or an environmental variable. In one such case, the delay circuitry is also operatively coupled to the DAC and for adjusting timing of data output by the DAC to compensate for propagation delay of the DDS system. In another such case, the system includes additional delay circuitry operatively coupled to the DAC and for adjusting timing of data output by the DAC to compensate for propagation delay of the DDS system, the additional delay circuitry including a plurality of delay elements that can be selected alone or in combination to adjust the timing of the data output by the DAC, and the additional delay circuitry adjusts the timing of the data output by the DAC by adjusting delay of a clock signal that clocks one or more pipeline registers of the DAC. The system may be included, for example, in a system-on-chip configuration (or in a chip set or with discrete components).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A ROM-based DDS system is disclosed that is configured to provide a variable clock delay that allows timing of data coming out of the ROM to be matched to the timing of the DAC. This variable clock delay approach further allows compensation for variations in propagation delays due to process variations and/or environmental conditions. The disclosed techniques can be implemented in any number of configurations, including integrated system-on-chip or chip set configurations as well as on printed circuit boards configured with various discrete DDS system components. The speed of the DDS system (e.g., below 1 GHz, or in the range of 1 to 20 GHz, or in excess of 20 GHz) will depend on the manufacturing processes employed as well as the particular application at hand, as will be appreciated in light of this disclosure.

General Overview

As previously explained, ROMs are typically not used to implement the phase-to-amplitude converter of a high-speed DDS circuit because propagation delays in the ROM circuit make it either impossible to pipeline at high-speed, or are too costly to pipeline in terms of power consumption. The ROM, however, can allow for improved SFDR over other approaches. Overcoming the limitations associated with a ROM-based DDS to exploit the improved SFDR is not a trivial task.

Thus, and in accordance with an embodiment of the present invention, a DDS system is provided that is configured with a phase accumulator, a ROM-based phase-to-amplitude converter, and a DAC. The output bits of the ROM generally have similar propagation delays. An adjustable clock delay circuit is used to take advantage of this approximately uniform (although larger than a clock cycle) propagation delay of the ROM bits, so the ROM can be pipelined and used in high-speed DDS circuits to enable improved SFDR.

In one specific example case, the adjustable clock delay circuit is used for the pipeline registers at the output of the ROM and in the DAC, to match the delayed pipeline timing. The variable clock delay allows the digital timing of the data coming out of the ROM to be matched to the timing of the DAC. Ideally, one might consider determining and implementing an appropriate fixed clock delay that would accomplish this timing match between the ROM and DAC. However, there are a number of issues associated with using a fixed delay.

For instance, and assuming modeling would be used in determining the appropriate fixed clock delay, the device models and parasitic extraction are not always sufficiently accurate. As such, there is some degree of ambiguity in simulations of a fixed clock delay circuit. In addition, there are variations in the devices and metallization from circuit to circuit within a single wafer, as well as variation between lots of wafers, that impact how well the simulation models match what is actually implemented as circuits which can be measured. In short, depending on how tightly the process for making the devices is controlled, variations in actual circuits versus models can be relatively high. Moreover, even if all the models were perfect, the performance of the devices varies, for instance, with temperature and supply voltages. For example, the timing seen at 0° C. will be different than the timing seen at 100° C. This is also the case, for example, for −10% of nominal voltage supplies versus+10% of nominal voltage supplies. So while it may be possible to design and model a correct timing relationship at one operating condition, the design may not work over a wide range of operating conditions.

The adjustable clock delay provided in accordance with an embodiment of the present invention allows for different timing settings to be used depending on variables such as the process variations, temperature, and supply voltages, and also allows for flexibility if there is ambiguity in the modeling. In addition, if there are any variations in the expected timing of a simulated DDS circuit compared to the actual timing of a fabricated, measured DDS circuit, different delay settings can be used to ensure that timing of ROM and DAC meet. This flexibility improves circuit yield and leads to a better chance of circuits working the first time they are fabricated.

The techniques provided herein are particularly suitable for high-speed DDSs, such as those operating in the 20 to 40 GHz range. These DDSs can be used, for example, as fast, agile local oscillator generators and jammers for system-onchip applications in commercial and military platforms. Note, however, that the techniques here may also be used in lower speed DDS applications, if so desired. Numerous other applications will be apparent in light of this disclosure.

System Architecture

Figure 1:
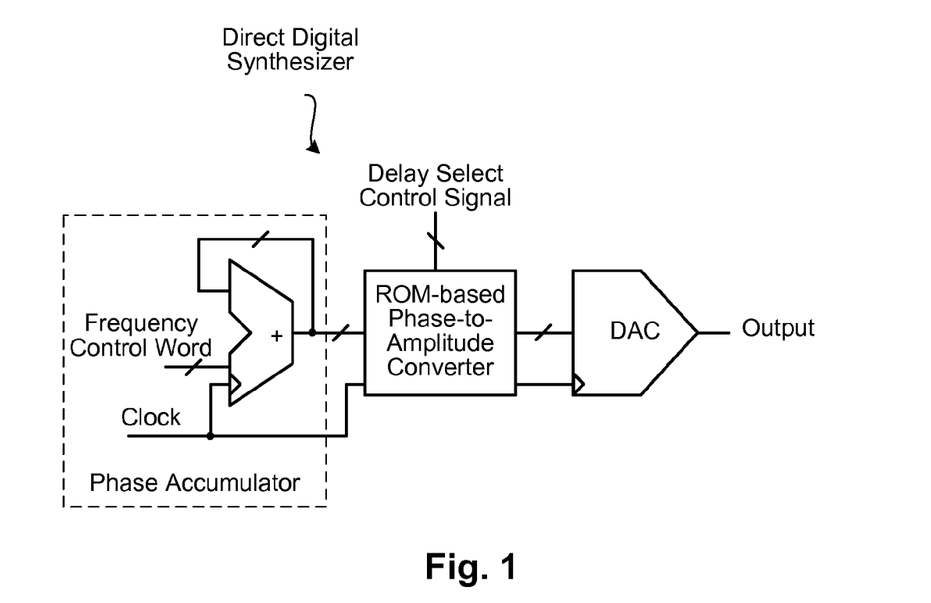
FIG. 1 is a block diagram of a DDS system having a ROM-based phase-to-amplitude converter, configured in accordance with one embodiment of the present invention.

FIG. 1 is a block diagram of a DDS system having a ROM-based phase-to-amplitude converter, configured in accordance with one embodiment of the present invention. The system can be implemented, for example, as an integrated system-on-chip configuration, but other embodiments can be implemented with chip sets and/or discrete components.

As can be seen, the DDS system includes a phase accumulator, ROM-based phase-to-amplitude converter, and a DAC, each of which operates in conjunction with a clock signal. The phase accumulator further receives a frequency control word as input, as will be explained in turn. In operation, the phase accumulator computes phase values representing phase angles, and the phase-to-amplitude converter outputs digital amplitude values corresponding to the phase values (e.g., a sine of the phase angle). The DAC converts the digital amplitude values into a corresponding analog amplitude (e.g., voltage or current), thereby producing an analog sinusoidal output signal (e.g., sine wave, square wave, triangle wave, etc).

Any number of suitable process technologies and material systems can be used in fabricating the DDS system. For example, for higher speed applications (e.g., in excess of 10 GHz), the DDS system can be implemented, for instance, in heterojunction bipolar transistor (HBT) and/or high electron mobility transistor (HEMT) technology. However, if such high speeds are not necessary (e.g., less than 2 GHz), then other technologies such as complementary metal oxide semiconductor (CMOS) technology can be utilized. Example materials from which the system can be implemented include III-V material systems such as gallium arsenide (GaAs) or indium phosphide (InP), or other suitable semiconductor material systems The phase accumulator can be implemented as typically done, and determines the frequency range and resolution of the DDS system. In particular, the clock speed at which the phase accumulator operates determines frequency range and the bit-width of the frequency control word determines the resolution. The phase accumulator essentially is a counter that increments its count for each pulse of the clock received. The magnitude of the increment is determined by the frequency control word (FCW), which is binary-coded. This FCW sets the phase step size between the clock updates. In general, the larger the phase step size, the faster the phase accumulator reaches full count and completes the corresponding sinusoidal cycle. Once overflowed, the counter effectively wraps around and repeats the counting process.

In operation, for instance, an 8-bit wide phase accumulator would provide a DDS frequency resolution of 1/256 of the clock frequency, with 128 steps of frequency control, and a 12-bit wide phase accumulator would provide a DDS frequency resolution of 1/4096 of the clock frequency, with 2048 steps of frequency control. For an 8-bit wide phase accumulator, an FCW of 1 (00000001) would result in the phase accumulator overflowing after $2^8$ clock cycles (256 increments), and an FCW of 128 (01111111) would result in the phase accumulator overflowing after two clock cycles, which is the minimum per Nyquist sampling theory. The bit width of the phase accumulator can vary from one embodiment to the next (e.g., from 4 to 48 bits), and the claimed invention is not intended to be limited to any particular phase accumulator configuration.

As is known, the basic tuning equation for a DDS architecture, which is: $f_{out}=[(FCW \times F_c)/2^n]$, where $f_{out}$ is the output frequency of the DDS system, FCW is the binary frequency control word, $F_c$ is the frequency of the clock signal, and n is the bit-length of the phase accumulator. Changes to the value of FCW result in immediate and phase-continuous changes in the output frequency $f_{out}$. As the $f_{out}$ is increased, the number of samples per cycle decreases. Since sampling theory dictates that at least two samples per cycle are required to reconstruct the output waveform, the maximum fundamental output frequency $f_{out}$ is one half the clock frequency $F_c$. For instance, and assuming the DDS has a 12-bit phase accumulator (n=12) and a clock frequency $F_c$ of 24 GHz, the DDS would be capable of synthesizing output frequencies up to 12 GHz in steps that are 1/4096 of the 24 GHz clock rate. Note, however, the output frequency may be limited to slightly less than that, giving consideration to real life factors such as improving the quality of the reconstructed waveform and output filtering. When generating a constant frequency, the output of the phase accumulator increases linearly, so the waveform generated by the phase accumulator is effectively a ramp (in the digital domain).

The digital phase value output of the phase accumulator is applied to the ROM-based phase-to-amplitude converter, which includes one or more ROMs for storing phase-to-amplitude conversion data and generating the corresponding digital amplitude values for each phase value received from the phase accumulator. As previously explained, ROM technology can limit the speed of a DDS. To this end, the overall speed of the DDS can be increased by reducing the bit access time of the ROM. For instance, and in one example embodiment, the ROM included in the ROM-based phase-to-amplitude converter can be implemented with a 16 by 6-bit, 36 GHz clock frequency ROM fabricated in any suitable process (e.g., InP DHBT process). Any number of fast access ROMs can be used here, as will be appreciated. Other embodiments not concerned with speed may of course use slower ROM technology.

The input bit width of the ROM-based phase-to-amplitude converter can vary from one embodiment to the next (e.g., from 4 to 24 bits), and the claimed invention is not intended to be limited to any particular input bit width range. Likewise, the DDS system clock frequency can vary as well, and in some embodiments ranges from to 20 GHz to 40 GHz, but other embodiments may have a lower or higher clock frequency, depending on the given application.

In addition to the ROM technology, the phase-to-amplitude converter is further configured to adjust the digital timing (delay) of the data coming out of the ROM with respect to the timing of the DAC. The adjustment can be made based on the delay select control signal, as will be explained in turn. Among other things, the adjustable delay allows for different timing settings to be used depending on factors such as the process variations, environmental conditions, and supply voltages (e.g., emitter-coupled logic or transistor-transistor logic supply voltages). For instance, the adjustable delay can be used to compensate for variations in propagation delays through the ROM and/or DAC circuitry due to process variations associated with HBT implementations and/or temperature in which the DDS is operating.

The adjustable delay in this example embodiment is shown as being integrated into the ROM-based phase-to-amplitude converter circuitry. However, in other embodiments, it may be implemented in a separate dedicated component that operatively couples with the ROM-based phase-to-amplitude converter. Moreover, the adjustable delay can be implemented for both the ROM and DAC. Alternatively, each of the ROM and DAC can have its own independent adjustable delay. Numerous configurations will be apparent in light of this disclosure. The ROM-based phase-to-amplitude converter will be discussed in more detail with reference to FIGS. 2a-b, 3, and 4.

The digital amplitude value output of the ROM-based phase-to-amplitude converter is applied to the DAC, which can be implemented as conventionally done, to convert the digital amplitude signal into its analog equivalent. The resolution of the DAC can vary from one embodiment to the next, but in some example embodiments is in the range of 4 to 12 bits. The claimed invention is not intended to be limited to any particular DAC configuration. Just as with the ROM-based phase-to-amplitude converter, the DAC is referenced to the clock signal and a clock delay associated with the DAC can be adjusted, in accordance with an embodiment of the present invention. Among other standard DAC componentry (e.g., resistive ladder network, current sources and switches, bias circuit, reference current, etc), the DAC includes one or more pipeline registers clocked by the clock signal, as adjusted by an adjustable clock delay circuit, in accordance with one example embodiment.

Any number of variations on the DDS shown in FIG. 1 will be apparent in light of this disclosure. For instance, other embodiments may include other componentry, such as a buffer circuit on the output of the DAC to drive a 50-ohm differential load off-chip or to some other target destination. In addition, the components may be integrated into a signal circuit (e.g., system on chip configuration), or may be implemented as separate modules that operatively couple to provide the desired DDS functionality. Other circuitry, such as processors or control circuitry for providing control and clock signals, power supply circuitry, filtering and/or signal shaping circuitry may also be provided as desired, depending on the application.

ROM-Based Phase-to-Amplitude Converter

Figure 2A:
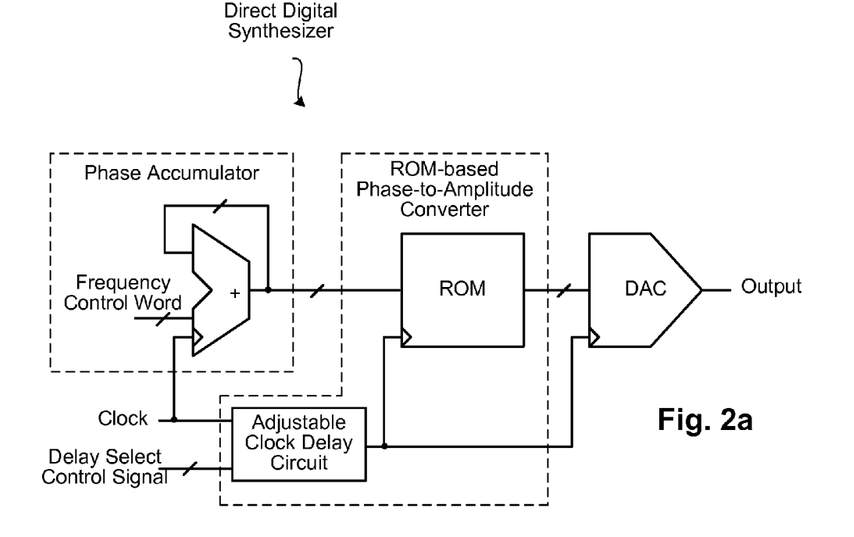
FIG. 2a is a block diagram showing further details of a ROM-based phase-to-amplitude converter, configured in accordance with one embodiment of the present invention.

FIG. 2a is a block diagram showing further details of a ROM-based phase-to-amplitude converter, configured in accordance with one embodiment of the present invention. As can be seen, the converter in this embodiment includes a ROM that is operatively coupled to an adjustable clock delay circuit, which is configured to receive the DDS system clock signal as well as a delay select control signal, and to output a delay adjusted clock signal. In this example case, the adjustable clock delay circuit output is also provided to the DAC clock input.

Figure 2B:
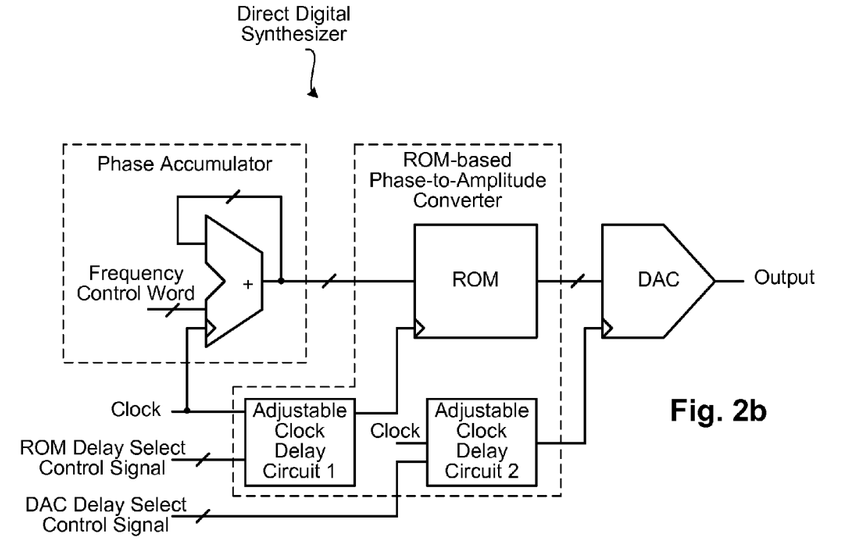
FIG. 2b is a block diagram showing further details of a ROM-based phase-to-amplitude converter, configured in accordance with another embodiment of the present invention.

In an alternative embodiment shown in FIG. 2b, each of the ROM and DAC is coupled to its own adjustable clock delay circuit. In particular, adjustable clock delay circuit 1 receives the clock signal and ROM delay select control signal, and outputs the delay adjusted clock signal to the ROM. In a similar fashion, adjustable clock delay circuit 2 receives the clock signal and DAC delay select control signal, and outputs the delay adjusted clock signal to the DAC. As previously explained, the adjustable clock signal delays allow for compensation of propagation delays associated with the corresponding ROM and DAC circuits and/or operating conditions. Using separate adjustable clock delay circuit allows for independent delay adjustment to ROM and DAC.

The clock delay control signal is a digital signal that can be generated off-chip or by on-chip (or otherwise external or internal to the DDS circuitry), for example, by a processor, and essentially configures the adjustable clock delay circuit to provide the desired amount of delay. The number of available clock delay control signals can be set to $2^N$, where N is the number of bits in the clock delay control signal. In general, some of the clock delay control signals will result in poor or otherwise sub-optimal DDS performance where the timing relationship between the ROM and DAC is incorrect and as a result digital glitches/wrong data are processed through the DAC (thereby causing erroneous DDS outputs), and some of the clock delay control signals will result in good or otherwise sufficient DDS performance where the ROM/DAC data is properly aligned and the correct data is processed through the DAC (thereby causing correct DDS outputs). Thus, in accordance with one embodiment of the present invention, a calibration routine can be run where each of the available clock delay control signals are sequentially applied in conjunction with a known FCW, and the DAC output can be monitored for correct signal value. For any given set of test parameters (e.g., FCW, operating temp, clock frequency), at least one of the clock delay control signals will cause a best or otherwise optimal DAC output relative to DAC outputs caused by the other clock delay control signals. Such a calibration routine can be carried out, for example, either manually as part of an initial check of the DDS, and/or as part of an automated calibration that can be run periodically or as requested.

The phase accumulator and DAC can be implemented as previously discussed with reference to FIG. 1, and that disclosure is equally applicable here. The ROM can be implemented as conventionally done, and in one embodiment includes an address decoder, row and column select circuits, an array of memory cells, sense amplifiers, and one or more pipeline registers (clocked by the clock signal output by the adjustable clock delay circuit). As will be appreciated, the input bits from which the address of interest is decoded can be set based on the coding scheme and output bits of the phase accumulator, and the output of the ROM can be configured to provide the number of bits desired, and may be, for example, thermometer-coded and/or binary coded. Example ROM configurations may range from 4 to 48 input bits and 4 to 64 output bits, but any other suitable configuration can be used. Note that the least significant bits of any stage digital output can be truncated or otherwise ignored if so desired, to reduce the number of output bits to suit the input bit range of the next stage.

Delay Select Control Signal (DSCS)

Figure 3A:
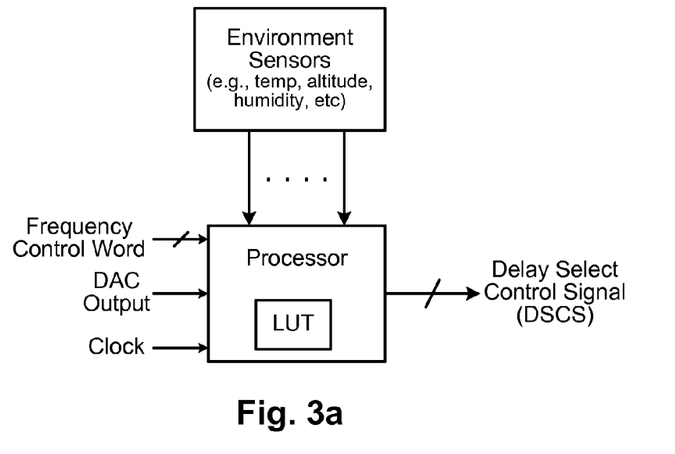
FIG. 3a is a block diagram showing a circuit configured for generating a delay select control signal, in accordance with one embodiment of the present invention.

FIG. 3a is a block diagram showing a circuit configured for generating a delay select control signal, in accordance with one embodiment of the present invention. As can be seen, a processor is configured to receive the FCW, clock, and DAC output, as well as input from one or more environmental sensors, such as temperature, humidity, altitude, and/or other input characterizing environmental variables that have an impact on DDS performance and a change in which can be sensed. The processor further includes a look-up table (LUT) that includes a plurality of entries, each entry defining a DDS operating parameter set (e.g., FCW, clock, and/or one or more environmental variables) along with a corresponding delay select control signal (DSCS) that provides optimal timing for the ROM and DAC operation of the given DDS under that operating parameter set. Table 1 illustrates an example LUT. As will be appreciated, the LUT may include any number of entries to provide the resolution needed for the desired degree of accuracy for a given DDS application.

TABLE 1

Example LUT

| Temp | FCW b2...b0 | Clock | DSCS b2 | b1 | b0 |
|---|---|---|---|---|---|
| 20 to 35° C. | 000 | 30 GHz | 0 | 0 | 0 |
| 20 to 35° C. | 001 | 30 GHz | 0 | 0 | 0 |
| 20 to 35° C. | 010 | 30 GHz | 1 | 1 | 0 |
| 20 to 35° C. | 011 | 30 GHz | 1 | 1 | 0 |
| 20 to 35° C. | 100 | 30 GHz | 1 | 1 | 0 |
| 20 to 35° C. | 101 | 30 GHz | 1 | 0 | 1 |
| 20 to 35° C. | 110 | 30 GHz | 1 | 0 | 1 |
| 20 to 35° C. | 111 | 30 GHz | 1 | 0 | 1 |

TABLE 1-continued

Example LUT

| Temp | FCW b2...b0 | Clock | DSCS b2 | b1 | b0 |
|---|---|---|---|---|---|
| 35 to 45° C. | 000 | 30 GHz | 0 | 0 | 1 |
| 35 to 45° C. | 001 | 30 GHz | 0 | 0 | 1 |
| 35 to 45° C. | 010 | 30 GHz | 1 | 1 | 1 |
| 35 to 45° C. | 011 | 30 GHz | 1 | 1 | 1 |
| 35 to 45° C. | 100 | 30 GHz | 1 | 1 | 1 |
| 35 to 45° C. | 101 | 30 GHz | 1 | 1 | 0 |
| 35 to 45° C. | 110 | 30 GHz | 1 | 1 | 0 |
| 35 to 45° C. | 111 | 30 GHz | 1 | 1 | 0 |
| 20 to 35° C. | 000 | 40 GHz | 0 | 1 | 1 |
| 20 to 35° C. | 001 | 40 GHz | 0 | 1 | 1 |
| 20 to 35° C. | 010 | 40 GHz | 0 | 0 | 0 |
| 20 to 35° C. | 011 | 40 GHz | 0 | 0 | 0 |
| 20 to 35° C. | 100 | 40 GHz | 0 | 0 | 0 |
| 20 to 35° C. | 101 | 40 GHz | 1 | 1 | 1 |
| 20 to 35° C. | 110 | 40 GHz | 1 | 1 | 1 |
| 20 to 35° C. | 111 | 40 GHz | 1 | 1 | 1 |
| 35 to 45° C. | 000 | 40 GHz | 0 | 1 | 1 |
| 35 to 45° C. | 001 | 40 GHz | 0 | 1 | 1 |
| 35 to 45° C. | 010 | 40 GHz | 0 | 0 | 0 |
| 35 to 45° C. | 011 | 40 GHz | 0 | 0 | 1 |
| 35 to 45° C. | 100 | 40 GHz | 0 | 0 | 1 |
| 35 to 45° C. | 101 | 40 GHz | 1 | 1 | 1 |
| 35 to 45° C. | 110 | 40 GHz | 1 | 1 | 1 |
| 35 to 45° C. | 111 | 40 GHz | 1 | 1 | 1 |

The LUT entries can be, for example, empirically developed by manually or automatically testing the given DDS for proper operation over a range of DDS operating parameter sets and testing each available corresponding delay select control signal for each DDS operating parameter set, to identify the best performing delay select control signal for a given parameter set. For instance, and with reference to the example of Table 1, if the DDS clock is set to 40 GHz, FCW is set to 001 (assuming a 3-bit wide phase accumulator), and the operating temperature of the environment in which the DDS is operating is in the range of 35 to 45° C., then a delay select control signal of 011 (assuming a 3-bit DSCS) is the one that provided the most accurate DAC output (for the known set of stimulus) of all the available delay select control signals.

The processor can be implemented with any suitable processor technology, such as a programmable microprocessor or a microcontroller programmed or otherwise configured to carry out the methodologies described herein. For example, a microcontroller configured with a number of input/output ports and a number of embedded routines for interrogating the current DDS operating parameter set and identifying a suitable DSCS as described herein. The input ports can each receive signals indicative of a given operating parameter, and an output port can provide the desired DSCS. The LUT can be stored in a memory on-board or otherwise accessible by the microcontroller. The microcontroller may further include memory (e.g., ROM or flash) for storing the various routines as well as workspace (e.g., random access memory) for executing those routines. Any number of processor configurations can be used.

Figure 3B:
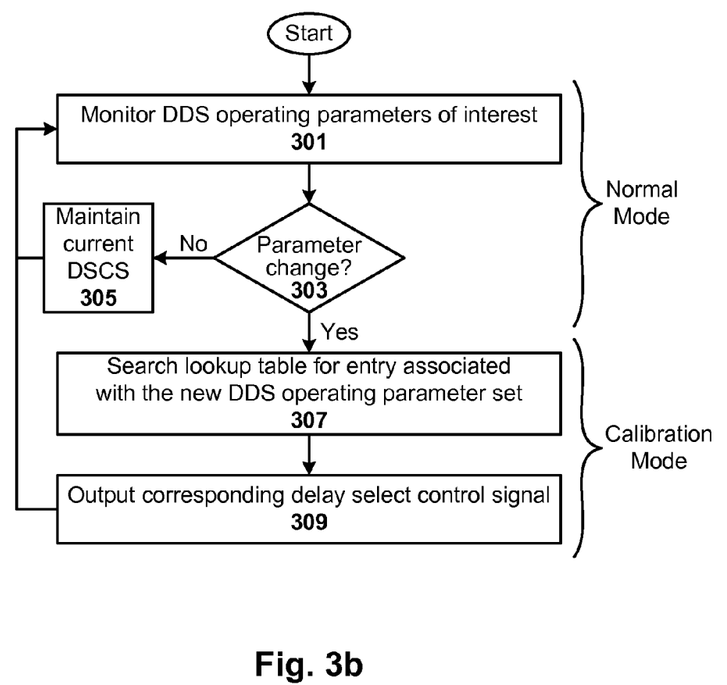
FIG. 3b illustrates a method for generating a delay select control signal, in accordance with one embodiment of the present invention.

FIG. 3b illustrates a method for generating a delay select control signal, in accordance with one embodiment of the present invention. This method can be carried out, for example, by the processor of FIG. 3a. As can be seen, the method includes a mode for normal DDS operation, and a mode for DDS calibration where the delay select control signal is updated based on changes in the DDS operating parameter set. The method includes monitoring 301 DDS operating parameters of interest, such as FCW, clock speed, and temperature of environment. The method continues with determining 303 if any parameter has changed. In one such example, each parameter can be associated with a pre-defined tolerance range, and any detection that a parameter is outside its tolerance range can be used to indicate a parameter change. Slight parameter changes that occur, but do not cause an out of tolerance reading can be treated as a non-change. If no parameter change is detected, then the method continues with maintaining 305 the current delay select control signal (DSCS). However, if a parameter change is detected, then the method continues with searching 307 a lookup table for an entry associated with the new DDS operating parameter set, and outputting 309 a corresponding delay select control signal associated with the new DDS operating parameter set.

Variations on the example embodiments shown in FIGS. 3a and 3b will be apparent in light of this disclosure. For instance, in another embodiment, rather than using a look-up table populated with empirically developed data, the processor can be programmed to monitor for changes in the DDS operating parameter set, and when such a change is detected, the calibration mode can be entered where known stimulus (clock, FCW, etc) are input to the DDS (in the given environment of interest). During calibration mode, the DAC output can be monitored in real-time for accuracy as the available delay select control signals are sequentially cycled through. After all available delay select control signals are tested, the one providing the DAC output closest in value to the desired DAC output value can be used for normal mode operation.

Adjustable Clock Delay Circuit

Figure 4A:
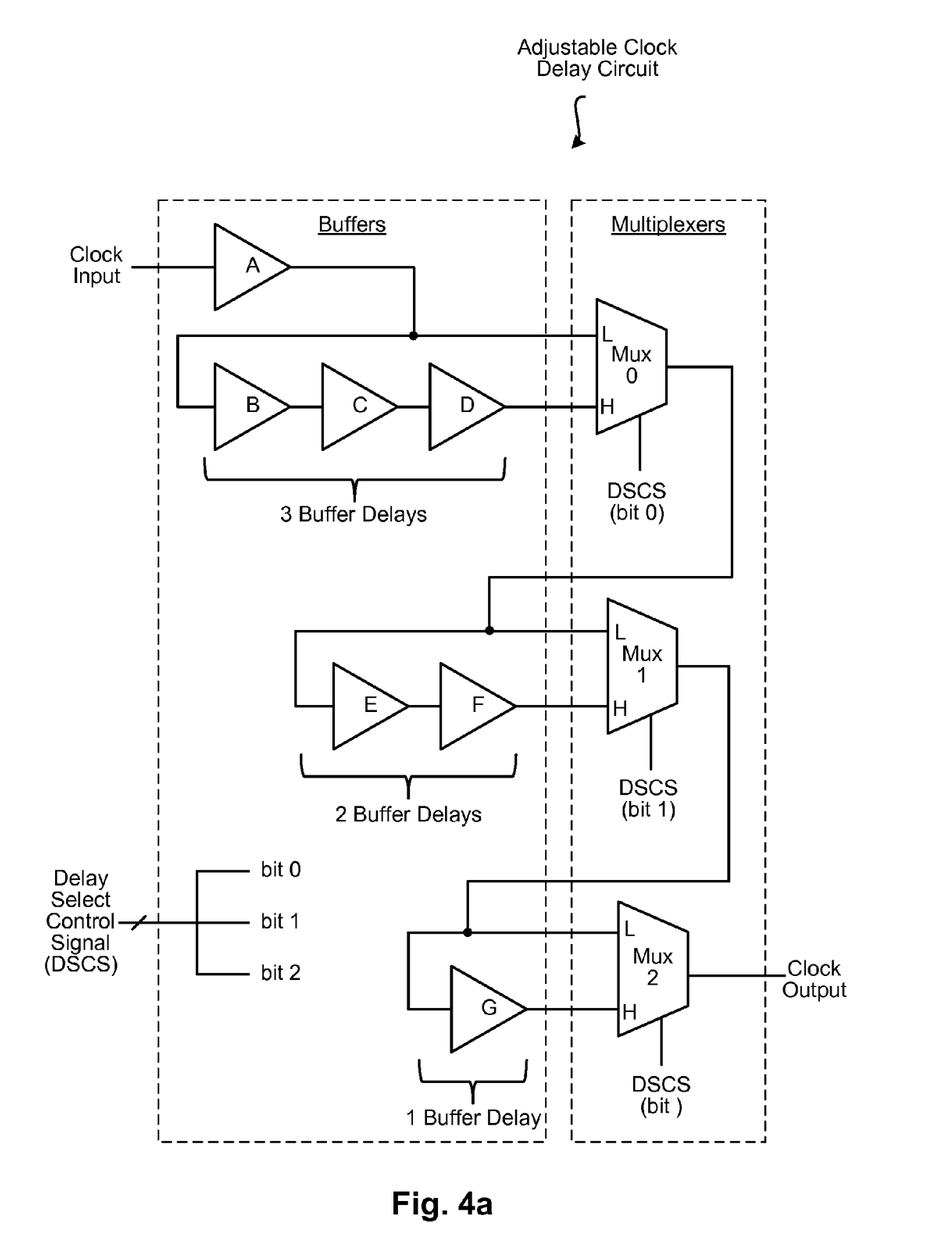
FIG. 4a is a block diagram of an adjustable clock delay circuit for use in a ROM-based phase-to-amplitude converter of a DDS system, configured in accordance with one embodiment of the present invention.

FIG. 4a is a block diagram of an adjustable clock delay circuit for use in a ROM-based phase-to-amplitude converter of a DDS system, configured in accordance with one embodiment of the present invention. As can be seen, the example adjustable clock delay circuit includes seven buffers (A through G) and three multiplexers (Mux 0, Mux 1, and Mux 2). The delay select control signal (DSCS) is 3-bits in this example, such that each of the three muxes is effectively controlled by one bit (i.e., Mux 0 by bit 0, Mux 1 by bit 1, and Mux 2 by bit 2).

This configuration allows for the selection of discrete delay increments, as provided by the buffers A-G. In general, each of the buffers A-G is associated with a fixed propagation delay, which can be exploited to delay the clock signal input by a known amount. The buffers can be implemented with any suitable buffer technology, and in one example case are implemented with unity gain buffers (voltage followers). Other embodiments may utilize buffers having amplifying or attenuating capability, if so desired. The multiplexers Mux 0, Mux 1, and Mux 2 can be implemented, for example, with a conventional high-speed multiplexer circuit design (e.g., such as the SN54/74LS157), and are used to select the desired amount of delay.

In operation, this example adjustable clock delay circuit allows for selection of 0 to 6 buffer delays, not counting buffer A (the delay of which is constantly applied). Such an implementation can be used, for instance, to provide full clock coverage for DDS systems operating up to 30 GHz. Note, however, that higher operating frequencies can be used by scaling the number of buffers and multiplexers accordingly. Table 2 demonstrates the operation of the adjustable clock delay circuit.

TABLE 2

| | | Adjustable Delay | | |
|---|---|---|---|---|
| Clock | Buffers | Delay Select Control | | |
| Delay | Used | b2 | b1 | b0 |
| 1 | A | 0 | 0 | 0 |
| 2 | A, G | 1 | 0 | 0 |
| 3 | A, E, F | 0 | 1 | 0 |
| 4a | A, B, C, D | 0 | 0 | 1 |
| 4b | A, E, F, G | 1 | 1 | 0 |
| 5 | A, B, C, D, G | 1 | 0 | 1 |
| 6 | A, B, C, D, E, F | 0 | 1 | 1 |
| 7 | A, B, C, D, E, F, G | 1 | 1 | 1 |

As can be seen, if the DSCS bit is logic 0, then the corresponding multiplexer switches the L input to the multiplexer output, which is effectively a non-delay feed through path (i.e., no buffers on path). However, if the DSCS bit is logic 1, then the corresponding multiplexer switches the H input to the multiplexer output, which will provide a unit of delay for each buffer on that path. A clock delay of 1 unit (buffer A) is provided for all DSCS. Note that for a delay of 4 units, there are two possible buffer delay paths (generally designated as 4a or 4b in Table 2, where buffers A,B,C,D or A,E,F,G, respectively, are switched into the delay path).

Figure 4B:
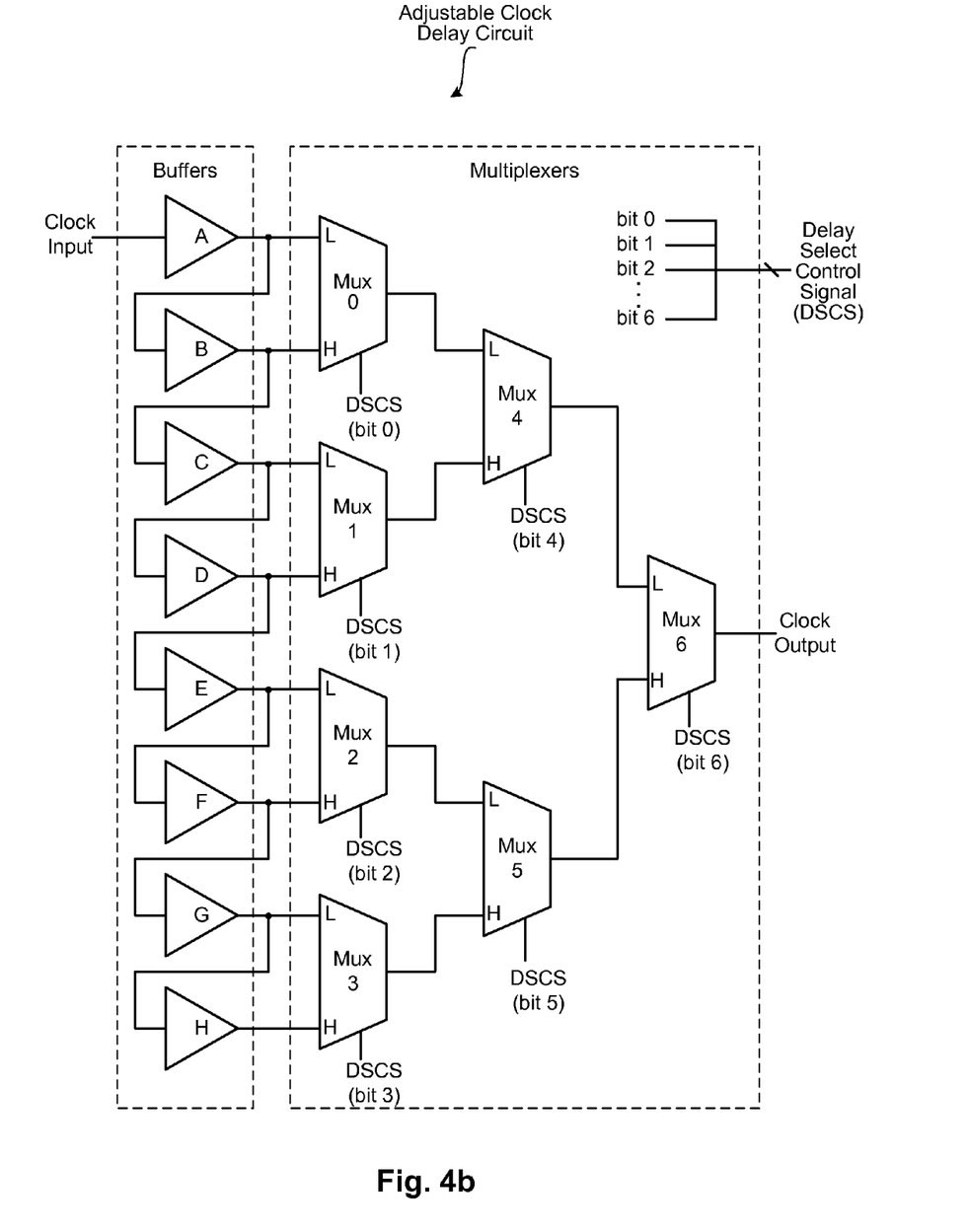
FIG. 4b is a block diagram of an adjustable clock delay circuit for use in a ROM-based phase-to-amplitude converter of a DDS system, configured in accordance with another embodiment of the present invention.

FIG. 4b is a block diagram of an adjustable clock delay circuit for use in a ROM-based phase-to-amplitude converter of a DDS system, configured in accordance with another embodiment of the present invention. In this example configuration, the adjustable clock delay circuit includes eight buffers (A through H) and seven multiplexers (Mux 0, Mux 1, Mux 2, Mux 3, Mux 4, Mux 5, Mux 6). The delay select control signal (DSCS) is 7-bits in this example, such that each of the seven muxes is effectively controlled by a corresponding one of the seven DSCS bits.

This configuration allows for the selection of discrete delay increments, as provided by the buffers A-H, each of which is associated with a fixed propagation delay that can be connected into the delay path by a combination of the multiplexers to delay the clock signal input by a known amount. The previous disclosure with respect to the buffers and multiplexers of FIG. 4a is equally applicable here. This configuration is also scalable to cover additional delays. Table 3 demonstrates the operation of the alternate adjustable clock delay circuit configuration of FIG. 4b.

TABLE 2

| | | | Adjustable Delay | | | | | | |
|---|---|---|---|---|---|---|---|---|---|
| Clock | Buffers | Muxes | Delay Select Control | | | | | | |
| Delay | Used | Used | b6 | b5 | b4 | b3 | b2 | b1 | b0 |
| 1 | A | 0, 4, 6 | 0 | 1 | 0 | 1 | 1 | 1 | 0 |
| 2 | A, B | 0, 4, 6 | 0 | 1 | 0 | 1 | 1 | 1 | 1 |
| 3 | A, B, C | 1, 4, 6 | 0 | 1 | 1 | 1 | 1 | 0 | 1 |
| 4a | A, B, C, D | 1, 4, 6 | 0 | 1 | 1 | 1 | 1 | 1 | 1 |
| 4b | A, B, C, D, E | 2, 5, 6 | 1 | 0 | 1 | 1 | 0 | 1 | 1 |
| 5 | A, B, C, D, E, F | 2, 5, 6 | 1 | 0 | 1 | 1 | 1 | 1 | 1 |
| 6 | A, B, C, D, E, F, G | 3, 5, 6 | 1 | 1 | 1 | 0 | 1 | 1 | 1 |
| 7 | A, B, C, D, E, F, G, H | 3, 5, 6 | 1 | 1 | 1 | 1 | 1 | 1 | 1 |

Just as with the embodiment of FIG. 4a, if the DSCS bit is logic 0, then the corresponding multiplexer switches the L input to the multiplexer output. However, if the DSCS bit is logic 1, then the corresponding multiplexer switches the H input to the multiplexer output. Note that a clock delay of 1 unit (buffer A) is provided for all DSCS. Further note the layout symmetry and duplicate conductor lengths for each of buffers B-H and muxes 0-6, such that the delay adjustment is predominantly provided by the buffers (rather than the conductors coupling the buffers and muxes from the clock input to the clock output).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A direct digital synthesis (DDS) system, comprising:
a read only memory (ROM) for storing phase-to-amplitude conversion data and generating digital amplitude values corresponding to respective digital phase values;
a digital-to-analog converter (DAC) for converting the digital amplitude values into corresponding analog amplitude values;
delay circuitry responsive to a control signal and operatively coupled to the ROM, the delay circuitry for adjusting timing of data output by the ROM to compensate for propagation delay of the DDS system such that timing of data coming out of the ROM is matched to timing of the DAC, the delay circuitry including a plurality of delay elements that can be selected alone or in combination to adjust the timing of the data output by the ROM; and
a processor for generating the control signal, wherein the control signal can change automatically during operation of the DDS system in response to a change in a monitored DDS operating parameter set, thereby providing a variable delay, wherein the DDS operating parameter set includes a frequency control word input to the DDS system, a clock signal having a cycle and for clocking one or more pipeline registers of the ROM, and an environmental variable;
wherein the DAC and ROM operate in conjunction with the clock signal, and propagation delay through the ROM is larger than one clock cycle.

2. The system of claim 1 further comprising:
a phase accumulator for computing the phase values based on a frequency control word.

3. The system of claim 1 wherein clocking frequency of the system is in the range of 20 GHz to 40 GHz.

4. The system of claim 1 wherein the delay circuitry is also operatively coupled to the DAC and for adjusting timing of data output by the DAC to compensate for propagation delay of the DDS system.

5. The system of claim 1 further comprising:
additional delay circuitry operatively coupled to the DAC and for adjusting timing of data output by the DAC to compensate for propagation delay of the DDS system, the additional delay circuitry including a plurality of delay elements that can be selected alone or in combination to adjust the timing of the data output by the DAC.

6. The system of claim 1 wherein the system is included in a system-on-chip configuration.

7. A direct digital synthesis (DDS) system, comprising:
a phase accumulator for computing the phase values based on a frequency control word;
a read only memory (ROM) for storing phase-to-amplitude conversion data and generating digital amplitude values corresponding to respective digital phase values provided by the phase accumulator;

a digital-to-analog converter (DAC) for converting the digital amplitude values into corresponding analog amplitude values;
variable delay circuitry responsive to a control signal and operatively coupled to the ROM, the delay circuitry for adjusting timing of data output by the ROM to compensate for propagation delay of the DDS system such that timing of data coming out of the ROM is matched to timing of the DAC, the delay circuitry including a plurality of delay elements that can be selected alone or in combination to adjust the timing of the data output by the ROM, and the delay circuitry adjusts the timing of the data output by the ROM by adjusting delay of a clock signal that clocks one or more pipeline registers of the ROM wherein the DAC and ROM operate in conjunction with a clock signal having a cycle, and propagation delay through the ROM is larger than one clock cycle; and
a processor for generating the control signal, wherein the control signal can change automatically during operation of the DDS system in response to a change in a monitored DDS operating parameter set, thereby providing a variable delay, wherein the DDS operating parameter set includes the frequency control word input to the DDS system, the clock signal for clocking one or more pipeline registers of the ROM, and an environmental variable.

8. The system of claim 7 wherein the delay circuitry is also operatively coupled to the DAC and for adjusting timing of data output by the DAC to compensate for propagation delay of the DDS system.

9. The system of claim 7 further comprising:
additional delay circuitry operatively coupled to the DAC and for adjusting timing of data output by the DAC to compensate for propagation delay of the DDS system, the additional delay circuitry including a plurality of delay elements that can be selected alone or in combination to adjust the timing of the data output by the DAC.

10. The system of claim 7 wherein the system is included in a system-on-chip configuration.

11. A direct digital synthesis (DDS) system, comprising:
a phase accumulator for computing the phase values based on a frequency control word;
a read only memory (ROM) for storing phase-to-amplitude conversion data and generating digital amplitude values corresponding to respective digital phase values provided by the phase accumulator;
a digital-to-analog converter (DAC) for converting the digital amplitude values into corresponding analog amplitude values;
variable delay circuitry responsive to a control signal and operatively coupled to the ROM, the delay circuitry for adjusting timing of data output by the ROM to compensate for propagation delay of the DDS system such that timing of data coming out of the ROM is matched to timing of the DAC to allow for pipeline operation, the delay circuitry including a plurality of delay elements that can be selected alone or in combination to adjust the timing of the data output by the ROM, and the delay circuitry adjusts the timing of the data output by the ROM by adjusting delay of a clock signal that clocks one or more pipeline registers of the ROM;
a processor for generating the control signal to which the delay circuitry is responsive, and for automatically changing the control signal during operation of the DDS system in response to a change in a monitored DDS operating parameter set, the DDS operating parameter set including the frequency control word input to the DDS system, the clock signal having a cycle and for clocking one or more pipeline registers of the ROM, and an environmental variable;
wherein the DAC and ROM operate in conjunction with the clock signal, and propagation delay through the ROM is larger than one clock cycle, and clocking frequency of the system being in the range of 20 GHz to 40 GHz.

12. The system of claim 11 wherein the delay circuitry is also operatively coupled to the DAC and for adjusting timing of data output by the DAC to compensate for propagation delay of the DDS system.

13. The system of claim 11 further comprising:
additional delay circuitry operatively coupled to the DAC and for adjusting timing of data output by the DAC to compensate for propagation delay of the DDS system, the additional delay circuitry including a plurality of delay elements that can be selected alone or in combination to adjust the timing of the data output by the DAC, and the additional delay circuitry adjusts the timing of the data output by the DAC by adjusting delay of a clock signal that clocks one or more pipeline registers of the DAC.

14. The system of claim 11 wherein the system is included in a system-on-chip configuration.

* * * * *